United States Patent
Ben Salah et al.

(10) Patent No.: US 10,189,100 B2
(45) Date of Patent: Jan. 29, 2019

(54) METHOD FOR WIRE ELECTRO-DISCHARGE MACHINING A PART

(75) Inventors: Nihad Ben Salah, Greenfield Park (CA); Alain Bouthillier, Sainte-Julie (CA); Michel Frederick, Candiac (CA); Jean Fournier, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1508 days.

(21) Appl. No.: 12/181,597

(22) Filed: Jul. 29, 2008

(65) Prior Publication Data
US 2010/0025379 A1     Feb. 4, 2010

(51) Int. Cl.
| | |
|---|---|
| *B64C 27/46* | (2006.01) |
| *B23K 9/00* | (2006.01) |
| *B23H 1/00* | (2006.01) |
| *B23H 1/08* | (2006.01) |
| *B23H 7/00* | (2006.01) |
| *B23H 7/34* | (2006.01) |
| *B23H 7/38* | (2006.01) |
| *B23H 9/10* | (2006.01) |
| *C23F 1/00* | (2006.01) |

(52) U.S. Cl.
CPC .............. *B23H 1/00* (2013.01); *B23H 1/08* (2013.01); *B23H 7/00* (2013.01); *B23H 7/34* (2013.01); *B23H 7/38* (2013.01); *B23H 9/10* (2013.01); *C23F 1/00* (2013.01); *Y10T 29/49336* (2015.01)

(58) Field of Classification Search
CPC . B64C 27/46; B23K 9/00; B23P 15/02; C23F 1/00; B23H 9/10; B23H 7/38; B23H 7/34; B23H 7/00; B23H 1/08; B23H 1/00

USPC ............ 219/69.11–69.17, 137 R; 416/223 R; 216/67; 29/889.7; 205/228; 428/658
See application file for complete search history.

(56) References Cited

U.S. PATENT DOCUMENTS

| | | | | |
|---|---|---|---|---|
| 2,392,456 | A | * | 1/1946 | Brown et al. ................. 205/177 |
| 2,905,539 | A | * | 9/1959 | Bowerman ................... 174/250 |
| 3,290,124 | A | * | 12/1966 | Holtzclaw, Jr. .............. 428/566 |
| 3,334,210 | A | * | 8/1967 | Williams et al. .......... 219/69.14 |
| 3,337,336 | A | * | 8/1967 | Rao .................................. 419/2 |
| 3,407,475 | A | * | 10/1968 | Koppius ......................... 419/28 |
| 3,468,724 | A | * | 9/1969 | Reinhold ...................... 148/270 |
| 3,563,819 | A | * | 2/1971 | Rheingold et al. ............. 216/53 |
| 3,689,387 | A | | 7/1972 | Jumer |
| 3,816,272 | A | | 6/1974 | Joslin |
| 3,847,506 | A | | 11/1974 | Straniti |
| 4,080,513 | A | * | 3/1978 | Cuneo et al. ................ 174/255 |
| 4,134,807 | A | | 1/1979 | Briffod |
| 4,159,407 | A | * | 6/1979 | Wilkinson et al. ........... 205/661 |
| 4,180,623 | A | * | 12/1979 | Adams ........................... 429/400 |

(Continued)

FOREIGN PATENT DOCUMENTS

| | | |
|---|---|---|
| CA | 1317444 | 5/1993 |
| CA | 2366325 A1 | 6/2003 |

(Continued)

*Primary Examiner* — Tu B Hoang
*Assistant Examiner* — Thomas Ward
(74) *Attorney, Agent, or Firm* — Norton Rose Fulbright Canada LLP

(57) ABSTRACT

A method for machining a part includes wire electro-discharge machining the part, and then selectively reducing a zinc content of the residual recast layer left on a surface of the part, while otherwise leaving the recast layer substantially intact.

14 Claims, 4 Drawing Sheets

(56) References Cited

U.S. PATENT DOCUMENTS

| | | | |
|---|---|---|---|
| 4,229,218 A * | 10/1980 | Gulla et al. | 106/1.23 |
| 4,251,706 A * | 2/1981 | Frei et al. | 219/69.14 |
| 4,287,404 A * | 9/1981 | Convers et al. | 219/69.12 |
| 4,324,589 A * | 4/1982 | Gulla et al. | 106/1.22 |
| 4,339,282 A | 7/1982 | Lada et al. | |
| 4,385,099 A * | 5/1983 | Fong et al. | 429/51 |
| 4,411,730 A * | 10/1983 | Fishter et al. | 216/94 |
| 4,463,241 A | 7/1984 | Smith | |
| 4,525,179 A * | 6/1985 | Gigl | 51/309 |
| 4,551,602 A * | 11/1985 | Inoue et al. | 219/69.14 |
| 4,584,450 A * | 4/1986 | Inoue | 219/69.17 |
| 4,686,153 A * | 8/1987 | Tominaga et al. | 428/610 |
| 4,717,804 A | 1/1988 | Tomalin | |
| 4,731,515 A * | 3/1988 | Savage et al. | 219/69.17 |
| 4,735,678 A * | 4/1988 | Mandigo et al. | 216/20 |
| 4,740,666 A * | 4/1988 | Tomalin et al. | 219/69.12 |
| 4,759,595 A * | 7/1988 | Boord et al. | 385/21 |
| 4,762,464 A | 8/1988 | Vertz et al. | |
| 4,806,721 A * | 2/1989 | Ito et al. | 219/69.12 |
| 4,819,325 A | 4/1989 | Cross et al. | |
| 4,826,580 A | 5/1989 | Masuzawa et al. | |
| 4,839,487 A * | 6/1989 | Ito et al. | 219/69.12 |
| 4,888,863 A | 12/1989 | Cox et al. | |
| 4,957,421 A * | 9/1990 | Baldi | 419/8 |
| 4,977,303 A * | 12/1990 | Briffod | 219/69.12 |
| 5,004,883 A * | 4/1991 | Brown et al. | 205/661 |
| 5,028,756 A * | 7/1991 | Ezaki et al. | 219/69.12 |
| 5,188,514 A | 2/1993 | Inserra et al. | |
| 5,197,361 A | 3/1993 | Carrier et al. | |
| 5,222,865 A | 6/1993 | Corsmeier | |
| 5,229,324 A * | 7/1993 | Turner et al. | 438/603 |
| 5,248,381 A | 9/1993 | Dunker et al. | |
| 5,269,057 A | 12/1993 | Mendham | |
| 5,322,599 A * | 6/1994 | Peters | 205/644 |
| 5,360,957 A * | 11/1994 | Haefner et al. | 219/69.16 |
| 5,380,974 A * | 1/1995 | Kaneko | 219/69.12 |
| 5,441,690 A * | 8/1995 | Ayala-Esquilin et al. | 264/277 |
| 5,457,330 A * | 10/1995 | Turner et al. | 257/188 |
| 5,464,959 A * | 11/1995 | Takahashi | 219/69.14 |
| 5,465,154 A * | 11/1995 | Levy | 356/632 |
| 5,605,639 A * | 2/1997 | Banks et al. | 219/69.17 |
| 5,643,424 A * | 7/1997 | Riffe et al. | 204/196.05 |
| 5,669,991 A * | 9/1997 | DeFilippo | 148/563 |
| 5,957,657 A | 9/1999 | Akita et al. | |
| 6,080,497 A * | 6/2000 | Carey et al. | 428/647 |
| 6,177,299 B1 * | 1/2001 | Hsu et al. | 438/149 |
| 6,286,211 B1 | 9/2001 | Turnquist et al. | |
| 6,306,523 B1 * | 10/2001 | Seong | 428/613 |
| 6,362,446 B1 | 3/2002 | Jones et al. | |
| 6,565,317 B2 | 5/2003 | Beeck et al. | |
| 6,621,034 B2 * | 9/2003 | Shibagaki et al. | 219/69.17 |
| 6,627,835 B1 | 9/2003 | Chung et al. | |
| 6,646,225 B1 * | 11/2003 | Wang et al. | 219/121.64 |
| 6,754,955 B1 | 6/2004 | Carl, Jr. et al. | |
| 6,838,297 B2 * | 1/2005 | Iwasaki et al. | 438/20 |
| 6,850,874 B1 | 2/2005 | Higuerey et al. | |
| 6,865,810 B2 | 3/2005 | Stinson | |
| 6,905,312 B2 | 6/2005 | Bourgy et al. | |
| 6,910,854 B2 | 6/2005 | Joslin | |
| 6,914,214 B2 | 7/2005 | Byrd et al. | |
| 6,969,817 B2 | 11/2005 | Lee et al. | |
| 7,007,383 B2 | 3/2006 | Przybylski et al. | |
| 7,097,422 B2 | 8/2006 | Rice et al. | |
| 7,211,143 B2 * | 5/2007 | Yang et al. | 117/84 |
| 2001/0002667 A1 | 6/2001 | Jones et al. | |
| 2001/0017289 A1 * | 8/2001 | Briffod et al. | 219/69.14 |
| 2002/0025232 A1 | 2/2002 | Miller | |
| 2003/0024699 A1 * | 2/2003 | Vinegar et al. | 166/244.1 |
| 2003/0060873 A1 * | 3/2003 | Gertner et al. | 623/1.15 |
| 2003/0221702 A1 | 12/2003 | Peebles | 134/1 |
| 2003/0235272 A1 * | 12/2003 | Appleby et al. | 378/147 |
| 2004/0064945 A1 | 4/2004 | Howley | |
| 2004/0067131 A1 | 4/2004 | Joslin | |
| 2004/0109765 A1 | 6/2004 | Benedetti et al. | |
| 2004/0169016 A1 * | 9/2004 | Adachi et al. | 219/69.15 |
| 2005/0118452 A1 * | 6/2005 | Nishino et al. | 428/667 |
| 2005/0150096 A1 * | 7/2005 | Stinson | 29/458 |
| 2005/0274625 A1 | 12/2005 | Joslin | |
| 2005/0287721 A1 * | 12/2005 | Yamamoto et al. | 438/149 |
| 2006/0138091 A1 * | 6/2006 | Lee | 219/69.12 |
| 2006/0222844 A1 * | 10/2006 | Stinson | 428/323 |
| 2006/0275553 A1 | 12/2006 | Subramanian | |
| 2007/0017819 A1 | 1/2007 | Joslin | |
| 2007/0068605 A1 * | 3/2007 | Statnikov | 148/558 |
| 2007/0095796 A1 * | 5/2007 | Reed et al. | 219/69.15 |
| 2007/0292710 A1 * | 12/2007 | Rigney et al. | 428/629 |
| 2007/0298173 A1 * | 12/2007 | Tang | 427/331 |
| 2008/0061038 A1 * | 3/2008 | Blanc et al. | 219/69.12 |
| 2008/0206060 A1 | 8/2008 | Roberts | |

FOREIGN PATENT DOCUMENTS

| | | |
|---|---|---|
| CA | 2502593 | 9/2006 |
| DE | 4203656 | 6/2000 |
| GB | 2442449 | 9/2008 |
| WO | 9517277 | 6/1995 |
| WO | 2003059569 | 7/2003 |
| WO | WO 2006026989 A1 * | 3/2006 |
| WO | 2006087292 | 8/2006 |

\* cited by examiner

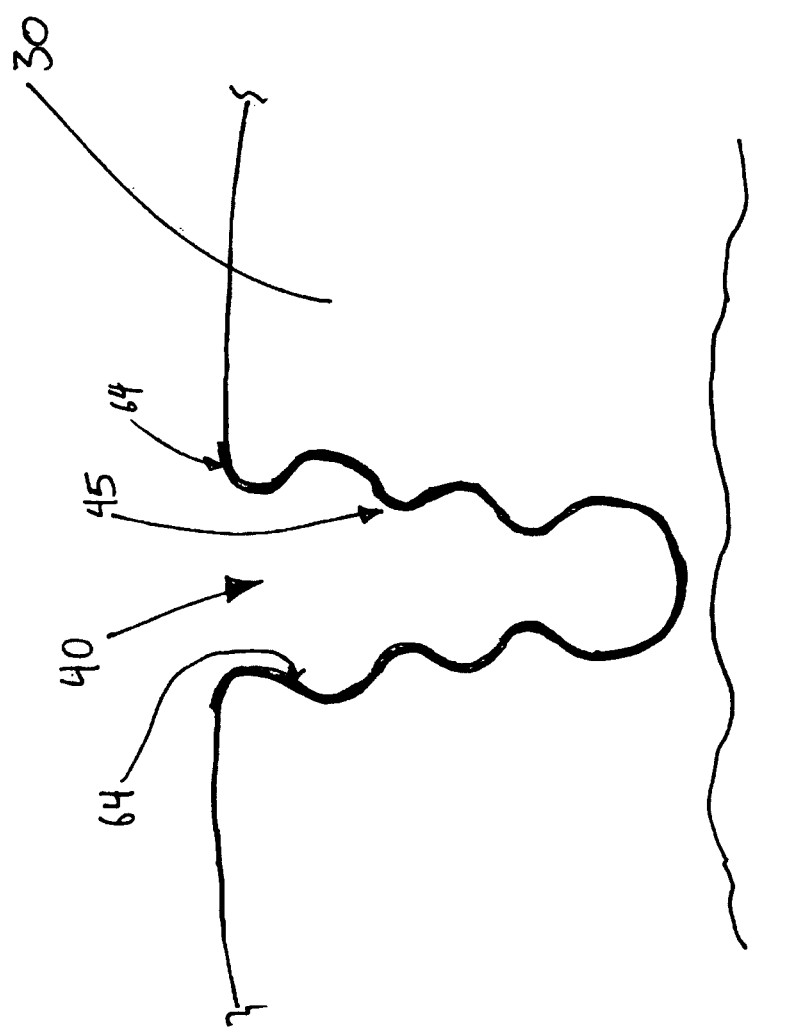

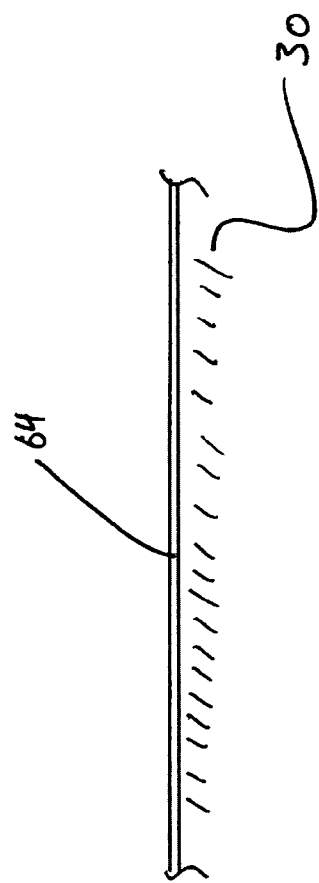

METHOD FOR WIRE ELECTRO-DISCHARGE MACHINING A PART

TECHNICAL FIELD

The technical field relates generally to a method for wire electro-discharge machining parts.

BACKGROUND OF THE ART

"Wire Electro-Discharge Machining" or "Wire Electric Discharge Machining (Wire-EDM) is a process that uses a wire electrode to machine metal. Wire-EDM may provide a highly accurate finished surface and a relatively inexpensive process. However, Wire-EDM causes localized melting of the base metal, which later solidifies into a recast layer. This recast layer gives the Wire-EDM-ed material undesirable properties from a fatigue life point of view. As such, when Wire-EDM has been used in the prior art, a secondary step involving the removal of the recast layer is sometimes performed, which is time consuming and costly, and further usually results in dimensional discrepancies. Improvement is therefore desired.

SUMMARY

There is provided a method for machining a part, comprising: wire electro-discharge machining the part using a wire electrode, the wire electro-discharge machining creating a recast layer on a surface of the metal part, the recast layer having a zinc content; and selectively reducing the zinc content of at least a portion of the recast layer while leaving the recast layer otherwise substantially intact.

There is also provided a method for processing a wire electro-discharge machined part, the part having a recast layer thereon produced by wire electro-discharge machining of the part, the method comprising the step of selectively reducing a zinc content in a recast layer formed by a wire electro-discharge machining process, wherein a substantial remainder of the constituents of the recast layer are left on the metal part after the performance of said step of reducing the zinc content.

There is also provided a method for producing a turbine disc of a gas turbine engine, the method comprising: removing material from the turbine disc by wire electro-discharge machining the turbine disc using a wire electrode; and selectively reducing a zinc content of a recast layer formed by the wire electro-discharge machining, while leaving the recast layer otherwise substantially intact.

There is further provided a turbine disc of a gas turbine engine comprising: at least one blade root slot formed in the turbine disc and having a firtree profile created by wire electro-discharge machining with a wire electrode and having a treated recast layer, the treated recast layer having a lower zinc content than an original recast layer obtained following the wire electro-discharge machining, the treated recast layer remaining otherwise substantially intact and substantially identical in make-up to the original recast layer composition.

Further details will be apparent from the detailed description and figures included below.

DESCRIPTION OF THE DRAWINGS

Reference is now made to the accompanying figures, in which:

FIG. 3 is a fragmentary cross-sectional view of a turbine disc having a firtree slot formed therein by Wire-EDM; and FIG. 4 is a schematic partial cross-sectional view of a Wire-EDM produced recast layer formed on the turbine disc of FIG. 3.

DETAILED DESCRIPTION

Figure 1:
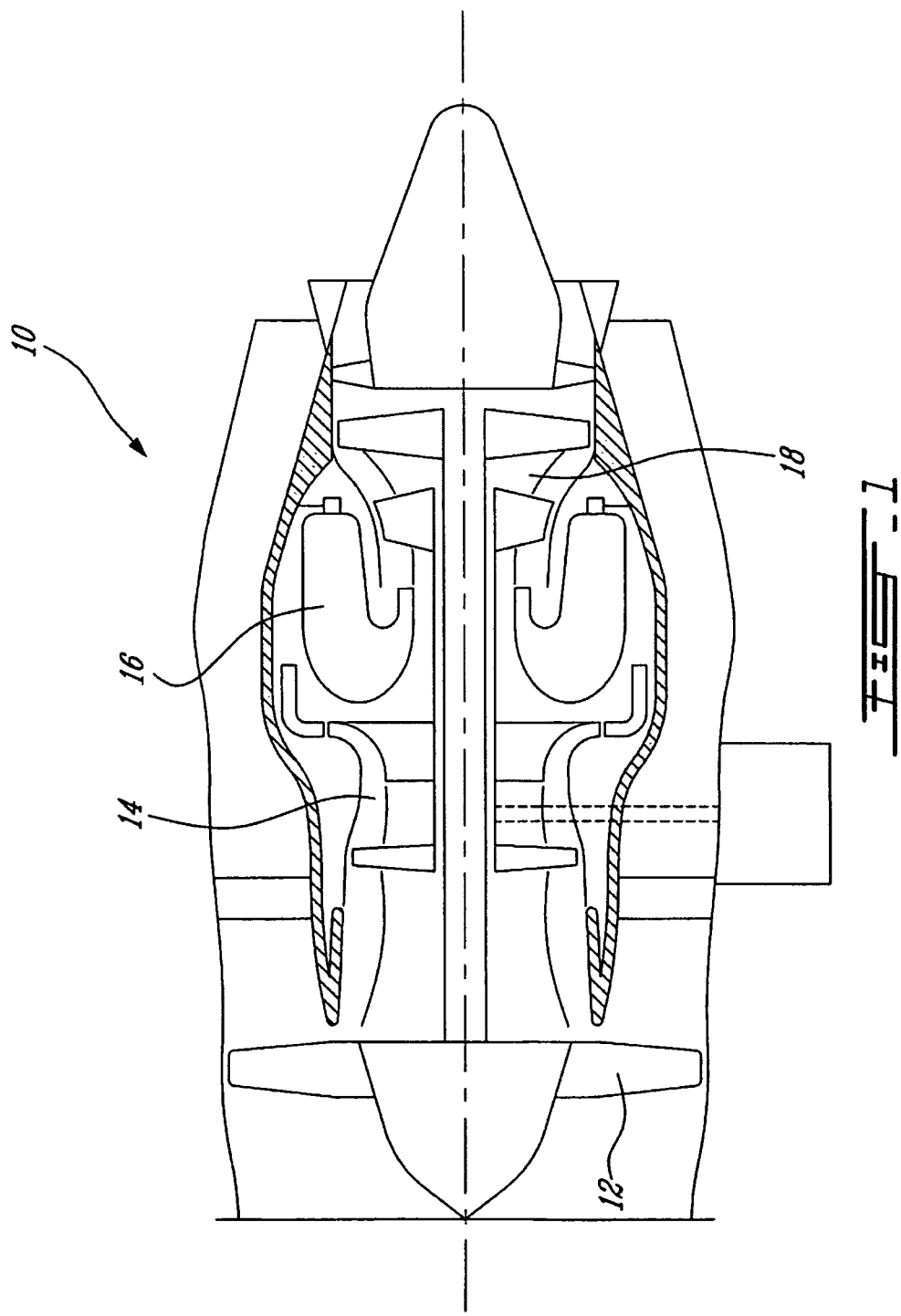
FIG. 1 is a schematic cross-sectional view of a gas turbine engine.

Wire-EDM is a machining process in which material may be removed from a part (i.e. profiles may be formed in the part) by spark erosion caused by electric discharge between a wire electrode and the workpiece. The wire electrode typically contains zinc, which is desired as an alloying element of the wire coating because it may provide higher cutting speeds and/or wire life. When Wire-EDM is used to cut through metal, a localized melting of the base metal occurs, which later solidifies into a so-called "recast layer". The recast layer contains low melting-point metals which are transferred to the material of the cut metal part from the wire electrode used, in the Wire-EDM process. However, this recast layer may give certain undesirable properties to the Wire-EDM-ed material and, such as a reduced low cycle fatigue (LCF) life. Wire-EDM processes of the prior art, therefore, sought to remove this recast layer completely from the machined part.

It has been observed by the present inventors, however, that only a certain constituent (i.e. element) of the recast layer, namely zinc, may contribute to, or may itself be, the cause of one or more of the undesirable properties of the recast layer, such as fatigue life reduction. Without intending to limit the scope of what is taught herein, it is believed that zinc may act as an embrittling agent when deposited on the surface of the part (i.e. in the recast layer) by diffusing at high temperature in the high stress areas through grain boundaries. This may weaken the grain boundaries and initiate intergranular rupture from the surface. The synergetic effect of the deposited zinc, the temperature, and the applied stress may therefore be the features which induce low cycle fatigue (LCF) life reduction in parts such as Wire-EDMed gas turbine engine components, such as turbine discs for example. Thus there may be stress, temperature, and zinc concentration thresholds required for the phenomena to initiate. When one of these factors is reduced, such as the stress or the zinc content, the material machined with Wire-EDM shows an extended LCF life.

Thus, removing zinc from the recast layer formed by the Wire-EDM process, either substantially entirely or partially, while leaving the recast layer otherwise substantially intact, may improve the properties of the Wire-EDMed part and increase its LCF life.

Therefore, after cutting and finishing by Wire-EDM as described in further detail below, a step of "cleaning" (as defined herein) or processing the surfaces of the part is performed, and particularly the recast layer formed by the Wire-EDM, by using a process or means that substantially eliminates or reduces to an acceptable level the amount of deposited zinc within the recast layer. Typically, the zinc amount is found to be around 100 to 250 nm deep from the outer exposed surface of the part, which makes its elimination or reduction relatively easy and can be carried out without otherwise removing the recast layer from the surface of the part. In this description, it understood that, for brevity, the terms "removing", "reducing" and variants thereof may refer interchangeably to mean either a partial removal or reduction of zinc content in the recast layer, or the substantially complete removal, reduction or elimination of zinc content from the recast layer.

In one embodiment, the zinc is removed from the recast layer of an exemplary alloy (such as Inconel™ or another Nickel supperalloy), using a chemical process (i.e. a process which uses primarily chemical, and not mechanical, means to remove zinc), such as by using a chemical bath as described below. However, other methods of removing or reducing the zinc content are also possible, such as by mechanically removing the zinc using a spindle deburring process, for example. In one example of a such a chemical method used to reduce or substantially remove the zinc from the recast layer and/or the rest of the part, the zinc is removed by immersing or plunging the Wire-EDM machined part, or at least a portion thereof including the recast layer, into a liquid solution that specifically targets the zinc such as at least reduce the zinc content of the recast layer. Such a zinc-targeting solution may remove the zinc from the recast layer by at least partly dissolving the zinc (which therefore remains in the solution) while leaving the other constituents (i.e. the composition) of the recast layer substantially intact. In other words, the zinc is targeted and removed by the solution by dissolving or leaching the zinc out of the recast layer and into the solution. Such zinc-targeting liquid solutions may include acidic solutions, such as a nitric or phosphoric acid solution for example. The term "zinc-targeting" is used herein to mean any, solution which may be used to remove (such as by dissolving, leaching or otherwise drawing out, for example) the zinc content from the recast layer. Acidic or non-acidic solutions which dissolve zinc can be used. Any suitable solution which reduces zinc content in the recast layer may be used.

In an embodiment, other constituent elements of the recast layer may be removed with zinc, either simultaneously or successively, if desired. Thus, the zinc removal step may be selective (i.e. it removes only the zinc) as described above, or non-selective (i.e. removes zinc and other constituents which may be present). Preferably, of course, the solution chosen to remove the zinc non-selectively does not remove and/or negatively impact the material of the part itself.

Other suitable zinc removal processes may be used. For example, and without limiting to the teachings herein, since zinc typically only affects a thickness of 100 to 250 mm from the outer surface of the recast layer (whereas the entire recast layer may be, for example, 5000 nm (i.e. 0.005 mm) in thickness), a process that affects this zinc-penetration depth of 100-250 nm may be used to remove the zinc, such as spindle deburring as mentioned above. Spindle deburring will only remove the relatively softer material, such as zinc, from the recast layer. The spindle deburring process therefore modifies the surface finish of the Wire-EDM surface, which includes at the same time the reduction of the amount of zinc deposited therein.

Therefore, zinc may be targeted for selective removal from the recast layer, or a given thickness (i.e. partial portion) of the recast layer may be removed (i.e. without removing the entire recast layer) in order to ensure that the zinc within this removed partial portion of the recast layer, is also removed from the part and remaining recast layer.

Figure 2:
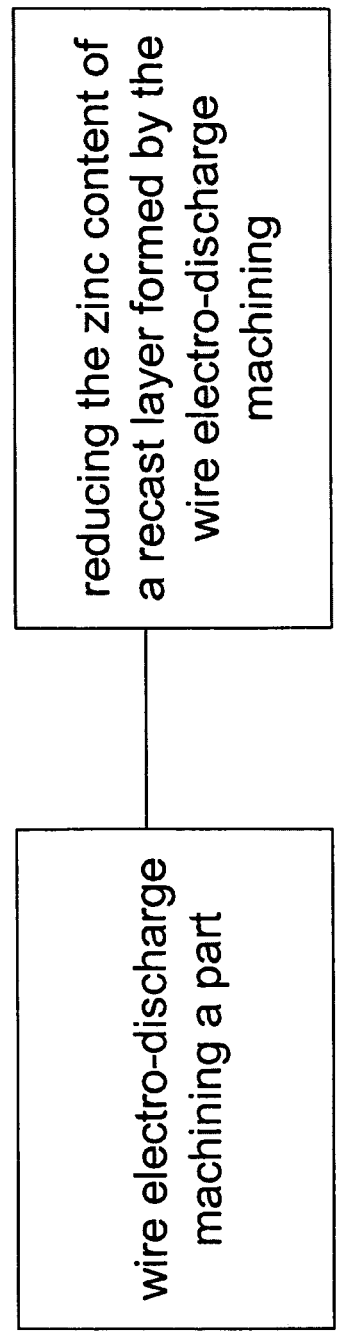
FIG. 2 is a schematic flow diagram of a method for machining a part.

As shown in FIG. 2, a method for machining a part may include the steps of: i) wire electro-discharge machining a metal (pure or alloyed) part with a wire electrode, such as one which may contain zinc, the wire electro-discharge machining creating a recast layer having a zinc content; and ii) reducing the zinc content of the recast layer surface while keeping the remainder of the recast substantially intact, which may include, in one example, keeping the composition make-up of the recast layer substantially identical except for the reduced zinc content. A remaining portion of the recast layer may otherwise be left on the surface of the part. The part being machined by Wire-EDM may be a nickel-based superalloy, and the zinc from the recast layer formed by the Wire-EDM process may be reduced or substantially eliminated by dipping the part, or at least a portion thereof including the recast layer, into a solution that dissolves the zinc, such as a nitric or phosphoric acid solution for example. In one embodiment, the part is left submersed in the zinc dissolving solution for a period of time selected to correspond to a point at which substantially no further zinc is removed from the recast layer into the solution.

Removing zinc from the recast layer allows one to avoid complete removal of the recast layer. which may improve the integrity of the part without having to remove the entire recast layer.

Removing the zinc from the recast layer, without entirely removing the recast layer, may improve the fatigue life of the part which is machined by a Wire-EDM process. As mentioned, zinc removal can be substantially complete or partial. Removal can also be selective or non-selective, i.e. primarily only zinc may be removed or zinc may be removed with other constituents. The zinc content of the recast layer, following the zinc removal step, is lower than the zinc content of the original recast layer, prior to the zinc removal step. The amount or percentage of zinc removed form the recast layer to achieve desired proprieties in a particular application will depend on the pre-removal zinc content, parent material, stress and temperature applied to the part, part geometry, etc., as will be appreciated by the skilled read in light of the present disclosure, and therefore there are processes parameters herein which may be tuned for use in each particular application. When a chemical bath is used to remove zinc, a predetermined time of submersion (i.e. of the part in the nickel-dissolving solution bath) may therefore be chosen based on the particular application, such that substantially no more zinc is removed from the recast layer beyond this period of time. This time period may however be varied, depending on the amount of zinc removal desired. For example, for lower expected temperature and stresses, less zinc may be removed to achieve the desired material properties of the part, and thus the submersion times may be shorter.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Turbine section 18 includes at least one turbine disc 30, having a plurality of turbine blades mounted thereto.

Referring to FIGS. 3 to 4, an exemplary part machined by Wire-EDM is a turbine disc 30, in order to form the slots 40 having a "firtree" profile 45 in the turbine disc 30, the firtree profile slots receiving the correspondingly shaped roots of the turbine blades therein. Since applying Wire-EDM alone to make the firtree profiles or slots creates a recast layer at the surface of the workpiece which may decrease the fatigue life of the part, the making of the turbine discs according to the teachings herein may be beneficial.

At least the firtree profiles 45, and/or the entire slots 40, may be formed in the turbine disc 30 using a Wire-EDM operation, which has the effect of creating a recast layer 64 (as schematically seen in FIG. 4), which is typically 0.005 mm thick, and which may contain zinc that is transferred to the base material of the part being machined (i.e. the disc 30) from the wire electrode used in the Wire-EDM process. If any other low melting point materials (such as tin, lead, cadmium, mercury, silver, etc.) exist in the wire electrode used in the Wire-EDM process, these materials may also be transferred to the recast layer. Any of these low melting point materials, if they exist in the electrode and thus if they are transferred to the recast layer, may be embrittling agents for the material of the part being machined (such as nickel, aluminium and iron-base materials, etc.) by Wire-EDM. Thus, according to the present method these low melting-point materials may also be removed from the recast layer, such as by immersing the part in a solution which dissolves the targeted element or by other suitable processes.

Zinc may be removed from the recast layer 64, as described above, by submerging the section of the disc 30 including the recess 40 into a fluid solution that dissolves zinc. Thus, the zinc content of the recast layer 64 is at least reduced to a desired level, or substantially entirely removed, depending on an operational requirement of the part (e.g. such as desired LCF life) while leaving the remainder of the recast layer 64 substantially otherwise intact.

In one embodiment, the process of submerging the disc 30 (or other part having the recast layer) in the zinc-dissolving solution may include two separate submersing steps. The part is first submerged in a first tank having the zinc-dissolving solution therein, and the solution is monitored and/or analyzed (i.e. controlled) to measure the amount of zinc (i.e. the zinc level) in the solution, and therefore the amount of zinc removed from the part. The zinc level in the solution is monitored, and the part is kept submerged in the zinc-removing solution until the zinc level rate of change drops below a selected threshold or alternately until the zinc-level rises to a selected maximum value. The part is then removed from the first tank, and subsequently submerged in a second tank, also containing a zinc-dissolving solution therein, which may be the same type of solution as in the first tank or a different one. The zinc-dissolving solution in the second tank is similarly monitored, such as to be able to determine the amount of zinc within this solution. This serves as a control and/or quality check method, in order to determine whether all or most of the zinc has been removed from the recast layer. If the amount of zinc in the solution within the second tank does not significantly increase after the part is submerged therein, then most or all of the zinc in the recast layer of the part may have been removed.

In one example, a turbine disc made of the nickel superalloy IN100™ is machined using a copper wire: electrode coated with a copper-zinc alloy to form the firtree slots in the disc. The slots are then Wire-EDM finished to a 32Ra maximum roughness. The disc is then entirely submersed in a solution of 60% nitric acid for 15 minutes and then removed, and washed with water and air dried. To confirm that the maximum zinc removal has occurred, the disc is then submersed again (i.e. a second dipping step) in the same type of zinc-dissolving nitric acid solution, and the solution analyzed to ensure that no substantial removal of zinc occurs in this second dipping step. This serves as an indication that the zinc has been substantially entirely removed from the recast layer.

It is of note that the method for removing zinc from the recast layer by submersing the turbine disc (or other part) in the zinc-dissolving solution may only remove the zinc content at is "free" within the recast layer, and may not remove the zinc alloyed with other elements (such as copper, for example), whether in the recast layer or the part itself. Without limiting the inventions claimed herein, it is believed that this "free" zinc may reduce the integrity (for example, the LCF life) of the part if left in the recast layer.

The above-described process may be applied to any suitable parts machined by Wire-EDM. Parts for a gas turbine engine which are LCF life critical, such as discs and shafts, may be particularly good candidates for this process, depending on the particular design considerations. Such parts which are W-EDMed using the above method may be made of nickel superalloys, stainless steels or aluminum alloys.

It will be appreciated that when other materials, such as, for example, ME16™, Waspaloy™, and Inconel™ 718, are wire-EDM machined, several other elements of the recast layer may be removed simultaneously while reducing the zinc content.

It is understood that zinc-dissolving processes may not work as well when used on parts made of low-alloy steels, as zinc-dissolving solutions may be harmful to this class of steels. However, the use of mechanical or other means to reduce zinc, such as by mechanical removal of the zinc portion of the recast layer (e.g. by spindle deburring or other mechanical processes) may be used on such materials.

The above description is meant to be exemplary only, and one skilled in the art will recognize that changes may be made to the embodiments described without departing from the inventions disclosed. For example, although turbine discs are described in the above example, it is to be understood that the present Wire-EDM method may be used to machine other gas turbine engine parts such as shafts, or non-gas turbine engine parts (i.e. parts used in other applications or industries), for example parts which may have difficult geometry to machine and/or require very tight tolerances. Still other modifications which fall within the scope of the present invention will be apparent to those skilled in the art, in light of a review of this disclosure, and such modifications are intended to fall within the appended claims.

The invention claimed is:

1. A method for machining a part, comprising, in sequence:
    wire electro-discharge machining the part using a wire electrode having a zinc component to create a recast layer having an initial composition make-up including a zinc content and at least one other material content in an outer surface thereof as a result of wire electro-discharge machining the part; and
    removing at least a portion of the zinc content from the outer surface of the recast layer without substantially altering the remainder of the initial composition make-up of the recast layer by submersing the part in a zinc-removing solution to remove the zinc content that is free within the recast layer and to produce a final composition make-up of the recast layer, the zinc-removing solution dissolving the zinc content that is free for removal from the outer surface and into the zinc-removing solution, the final composition make-up being substantially identical to the initial composition make-up except for the removed zinc content.

2. The method as defined in claim 1, wherein removing the at least portion of the zinc content from the outer surface of the recast layer comprises removing at least a portion of non-alloyed zinc content from the outer surface of the recast layer.

3. The method as defined in claim 1, wherein removing the at least portion of the zinc content from the outer surface of the recast layer comprises substantially eliminating the at least portion of the zinc content from the outer surface of the recast layer.

4. The method as defined in claim 1, wherein removing the at least portion of the zinc content from the outer surface of the recast layer comprises substantially removing the at least portion of the zinc content from the outer surface having a thickness of about 100 nm.

5. The method as defined in claim 1, wherein removing the at least portion of the zinc content from the outer surface of the recast layer comprises substantially removing the at least portion of the zinc content from the outer surface having a thickness of about 250 nm.

6. The method as defined in claim 1, wherein the zinc-removing solution is a nitric acid solution.

7. The method as defined in claim 1, wherein exposing the outer surface of the recast layer to the zinc-removing solution comprises submerging at least the recast layer in the zinc-removing solution.

8. The method as defined in claim 7, wherein submerging at least the recast layer in the zinc-removing solution comprises submerging at least the recast layer in the zinc-removing solution for 15 minutes.

9. The method as defined in claim 7, further comprising monitoring a zinc level of the zinc-removing solution, and keeping the outer surface of the recast layer submerged in the zinc-removing solution until the zinc level rate of change drops below a selected threshold.

10. The method as defined in claim 7, further comprising monitoring a zinc level of the zinc-removing solution, and keeping the outer surface of the recast layer submerged in the zinc-removing solution until the zinc level rises to a selected maximum value.

11. The method as defined in claim 1, wherein removing the at least portion of the zinc content from the outer surface of the recast layer comprises mechanically removing a portion of the outer surface of the recast layer high in zinc content while leaving a remainder of the recast layer otherwise substantially intact.

12. The method as defined in claim 1, wherein the part is a turbine disc of a gas turbine engine, and wherein the wire electro-discharge machining step comprises forming a firtree profiled slot within the disc.

13. The method as defined in claim 1, wherein the part is composed of a nickel based superalloy.

14. The method as defined in claim 1, wherein the part is composed of a material selected from the group consisting of nickel based superalloys, stainless steels and aluminum alloys.

\* \* \* \* \*